United States Patent
Gipson

(10) Patent No.: US 10,642,871 B2
(45) Date of Patent: May 5, 2020

(54) NETWORKED AGGREGATION OF LOCALIZED PARTICULATE AIR POLLUTANT SENSORS

(71) Applicant: DISH Network L.L.C., Englewood, CO (US)

(72) Inventor: Janet Gipson, Aurora, CO (US)

(73) Assignee: DISH Network L.L.C., Englewood, CO (US)

(*) Notice: Subject to any disclaimer, the term of this patent is extended or adjusted under 35 U.S.C. 154(b) by 205 days.

(21) Appl. No.: 15/955,336

(22) Filed: Apr. 17, 2018

(65) Prior Publication Data

US 2019/0318017 A1    Oct. 17, 2019

(51) Int. Cl.
| | |
|---|---|
| *G06F 16/00* | (2019.01) |
| *G06F 16/29* | (2019.01) |
| *G06F 16/248* | (2019.01) |
| *H04W 84/18* | (2009.01) |
| *G06T 11/20* | (2006.01) |

(52) U.S. Cl.
CPC ............ *G06F 16/29* (2019.01); *G06F 16/248* (2019.01); *G06T 11/206* (2013.01); *H04W 84/18* (2013.01)

(58) Field of Classification Search
CPC ....... G06F 16/29; G06F 16/248; H04W 84/18
See application file for complete search history.

(56) References Cited

PUBLICATIONS

Linda H. Geiser and Peter N. Neitlich, "Air Pollution and Climate Gradients in Western Oregon and Washington Indicated by Epiphytic Macrolichens", www.sciencedirect.com, Evironmental Pollution 145 (2007), pp. 203-218. (Year: 2007).*
Rober J. Laumbach, MD, MPH and Howard M. Kipen MD, MPH, "Respiratory Health Effects of Air Pollution: Update on Biomass Smoke and Traffic Pollution", Clinical Reviews in Allergy and Immunology, 2012, American Academy of Allergy, Asthma & Immunology, pp. 3-11, Elsevier, www.sciencedirect.com (Year: 2012).*

* cited by examiner

*Primary Examiner* — Cheryl Lewis
(74) *Attorney, Agent, or Firm* — Kilpatrick Townsend & Stockton LLP

(57) ABSTRACT

Novel techniques are described for networked aggregation of distributed localized particulate air pollutant (LPAP) sensors. For example, a large number of sensors is distributed over a geographic region. Each sensor can detect local levels of one or more LPAPs, and can communicate the detected levels over one or more communications networks. A system can receive data samples for the LPAP levels from the sensors and can compute LPAP scores that are mapped to respective sub-regions of the geographic region. The computation can be a function of aggregating respective LPAP levels for at least those LPAP sensors in a particular sub-region of the geographic region, and also as a function of comparing the aggregation against an identified set of trigger thresholds for the LPAP of interest. In some cases, the computed and mapped LPAP scores can be output for display, for example, as a heat map, or the like.

20 Claims, 5 Drawing Sheets

NETWORKED AGGREGATION OF LOCALIZED PARTICULATE AIR POLLUTANT SENSORS

FIELD

This invention relates generally to sensor device systems, and, more particularly, to networked aggregation of distributed localized particulate air pollutant sensors.

BACKGROUND

Some types of environmental pollution result from particulates trapped in the air, such as from cigarette and marijuana smoke. These particulates can generally spread from their sources into surrounding areas, causing undesirable conditions, such as bad odors and harmful second-hand smoke. A large subset of the population is concerned about these types of generally localized environmental pollution. As an example, builders, buyers, and users of schools, hospitals, homes, and the like may not want to be in areas with high levels of such pollutants. However, those affected portions of the population may not have any practical and efficient way to obtain localized data regarding such pollutants.

BRIEF SUMMARY

Among other things, embodiments provide novel systems and methods for networked aggregation of distributed localized particulate air pollutant sensors. Embodiments operate in context of a large number of sensors distributed over a geographic region. Each sensor can detect levels in a respective location of one or more types of localized particulate air pollutant (LPAP), and can communicate the detected levels over one or more communications networks. A system can receive data samples for the LPAP levels from the network-connected LPAP sensors and can compute LPAP scores that are mapped to respective sub-regions of the geographic region. The computation can be a function of an aggregation of the respective LPAP levels for at least those of the LPAP sensors having respective LPAP sensor locations corresponding to a respective sub-region of the geographic region, and also as a function of comparing the aggregation against an identified set of trigger thresholds for the LPAP of interest. In some cases, the computed and mapped LPAP scores can be output for display, for example, as a heat map, or the like.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
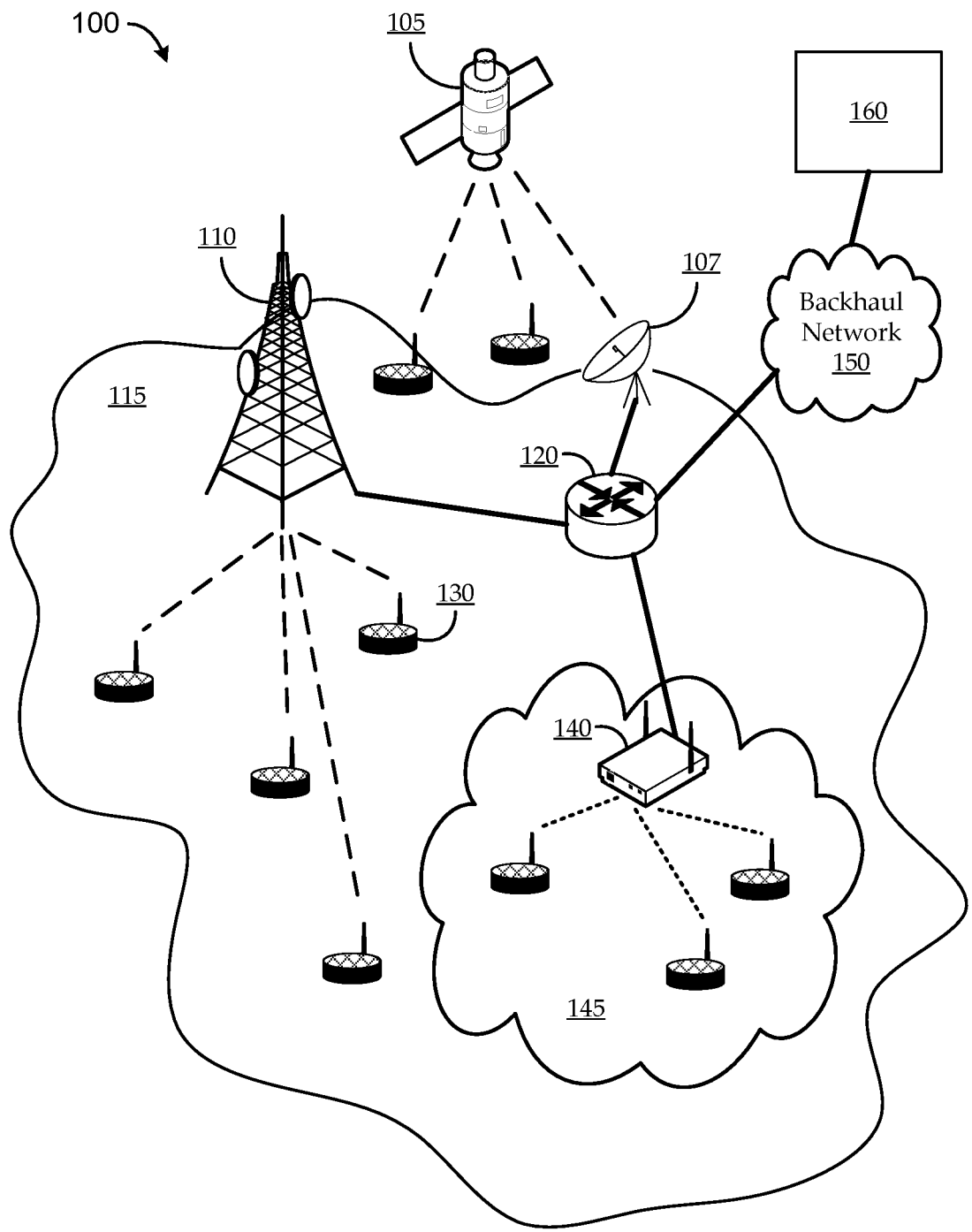
FIG. 1 shows an illustrative communications system for networked aggregation of distributed localized particulate air pollutant (LPAP) sensors, according to various embodiments.

FIG. 1 shows an illustrative communications system 100 for networked aggregation of distributed localized particulate air pollutant (LPAP) sensors, according to various embodiments. As used herein, the term "localized particulate air pollutant," or "LPAP," generally refers to any type of localized air pollution resulting from particulates in the air that can be disturbing or unhealthy for people or animals in proximity to the particulates. Typically, the LPAPs are associated with undesirable or harmful odors, smoke, fumes, or the like, such as from cigarette smoke, marijuana smoke, certain manufacturing (e.g., fumes from a small leather tanning shop), certain artistic endeavors (e.g., paint or other fumes), cooking (e.g., strong odors from certain types of food), etc. These particulates typically originate from a small source (e.g., a cigarette, restaurant kitchen, small printing press, etc.), and can spread from the source into local surroundings. Certain populations can benefit from an awareness of the presence and/or levels of certain LPAPs in certain locales. For example, builders, buyers, and users of schools, hospitals, homes, and the like may not want to be in areas with high levels of certain LPAPs.

Embodiments described herein seek to process LPAP level data from across wide geographical areas and large numbers of sensors to provide aggregated LPAP level data. Such data can be used to compute LPAP scores according to particular thresholds and to map the scores to different resolutions of sub-regions. For example, in response to mapping requests, embodiments can compute and generate heat maps, or the like, to indicate levels of selected LPAPs across selected sub-regions of a geographical region.

In general, the communications system 100 includes a large number of network-connected LPAP sensors 130 in communication, via one or more networks, with a LPAP mapping system 160. Each LPAP sensor 130 can be adapted to detect levels, in proximity to the LPAP sensor 130, of one or more LPAPs. Each LPAP sensor 130 can be constructed and deployed in any suitable manner. Some LPAP sensors 130 are implemented as stand-alone sensor systems having a sensor system on a chip housed in a housing with an integrated antenna (e.g., as an Internet of Things (IoT) device). The sensor system on a chip can be designed to detect certain types of particulates in the air and can be coupled with a communications chip that can communicate sensed levels via the antenna to one or more networks. Other LPAP sensors 130 can be integrated into another system, such as a weather station, residential satellite receiver, etc. Some LPAP sensors 130 can be privately owned (e.g., owned by an individual homeowner and installed in or on the customer's premises); while others can be owned by a communications services provider (e.g., a network provider), by a municipality, and or by any other suitable individual or entity.

The LPAP sensors 130 are typically deployed outside to detect outside air particulate levels. However, some implementations support indoor LPAP sensors 130, as well. In such implementations, various techniques can be used to discriminate data from indoor and outdoor LPAP sensors 130 to avoid misleading sensor level information. As an example, suppose a first cigarette smoke LPAP sensor 130 is disposed in the interior of a restaurant that permits smoking, and a second cigarette smoke LPAP sensor 130 is disposed on the exterior of the restaurant. For a potential buyer of a house across the street from the bar, it may be misleading to characterize local LPAP levels based on the data from the first sensor; but a potential family deciding whether to eat at the restaurant may be much more interested in the LPAP level data from the first sensor. In these and other cases where it is useful to discriminate between level data from different LPAP sensors 130 (or different categories or types of LPAP sensors 130), received data can be treated differently (e.g., computed against different threshold levels, normalized differently, etc.), displayed differently (e.g., using color coding, or other indications), etc.

The LPAP sensors 130 can be in communication with the LPAP mapping system 160 over any suitable type of network or networks. Some embodiments of the LPAP sensors 130 are implemented as IoT devices and are in communication with an IoT network, such as a low-power narrowband network. In some embodiments, some or all LPAP sensors 130 include antennas for communicating with a satellite or cellular network. A typical satellite network can include one or more satellites 105 (e.g., one or more low Earth orbit (LEO), medium Earth orbit (MEO), geostationary (GEO), or other satellites) in communication with ground network components 107, such as gateways, satellite receivers, etc. using one or more satellite communication protocols. One or more of the ground network components 107 is typically in communication with one or more routing components 120, such as routers, switches, etc. Similarly, a typical cellular network can include multiple cellular base stations 110 in communication with such routing components 120. Other types of communications networks, such as cable or public switched telephone networks (PSTNs) can similarly be in communication with such routing components 120. The routing components 120 can effectively provide the various networks with connectivity to the Internet and/or other networks, such as via a backhaul network 150, which can include fiber-optic or other suitable links.

The LPAP sensors 130 can be in communication with any of these or other suitable types of networks. In some implementations, the LPAP sensors 130 are in direct communication with the satellite(s) 105, cellular base stations 110, etc. via one or more integrated or coupled cellular antennas using one or more suitable communication protocols (e.g., Long-Term Evolution (LTE) protocols, or the like). In such implementations, LPAP sensors 130 can gather LPAP level data and communicate the data directly to the satellite(s), cellular base stations, etc., which can forward the data to the LPAP mapping system 160 via one or more intermediary networks. In other implementations, the LPAP sensors 130 are in indirect communication with the satellite(s) 105, cellular base stations 110, etc. via one or more intermediary networks. FIG. 1 shows an illustrative intermediary network as a local area network (LAN) 145 implemented by a local router 140. In such an implementation, the LPAP sensors 130 can include integrated or coupled antennas to communicate directly or indirectly with the local router 140 using any suitable wired or wireless communication protocols (e.g., WiFi, ZigBee, Bluetooth, Ethernet, etc.). In such implementations, LPAP sensors 130 can gather LPAP level data and communicate the data to the local router 140, which can then forward the data to one or more networks (e.g., a satellite, cellular, cable, PSTN, or other network) and/or one or more routing components 120 ultimately coupled with the backhaul network 150.

The described network architectures are intended only to illustrate and include some of the possible implementations. For example, some of the above-described networks can be implemented as hub-spoke configurations, peer-to-peer configurations, mesh configurations, or other configurations. Further, the particular connections can be altered in any suitable manner. While the LPAP mapping system 160 is illustrated and described above as coupled via the backhaul network 150; the LPAP mapping system 160 can alternatively be disposed (partially or completely) within one or more of the other networks. For example, in a satellite network implementation, the LPAP mapping system 160 can be implemented within a satellite gateway, or in another provider-side component.

Figure 2:
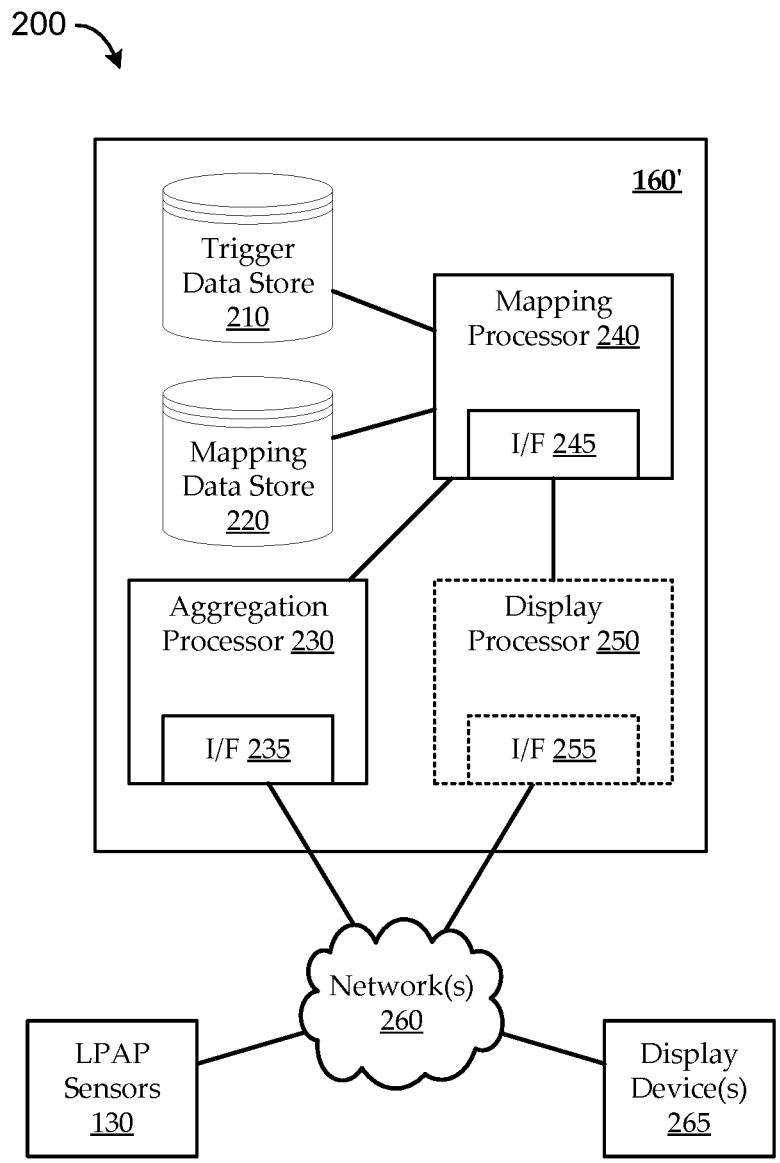
FIG. 2 shows an illustrative LPAP mapping environment, according to various embodiments.

FIG. 2 shows an illustrative LPAP mapping environment 200, according to various embodiments. The LPAP mapping environment 200 can be part of the communications system 100 of FIG. 1, and can include an illustrative LPAP mapping system 160 (illustrated as LPAP mapping system 160'). For the sake of context, the LPAP mapping system 160' is illustrated as in communication with a large number of LPAP sensors 130 via one or more networks 260. The one or more networks 260 can include any or all of the various types of networks illustrated and discussed with reference to FIG. 1 and/or any other suitable networks.

Embodiments of the LPAP mapping system 160' include a trigger data store 210, a mapping data store 220, an aggregation processor 230, and a mapping processor 240. The trigger data store 210 and the mapping data store 220 can be implemented using local storage devices (e.g., hard disk drives, solid state drives, registers, etc.), remote storage (e.g., servers, cloud storage systems, etc.), and/or any other suitable type of data storage. For example, one or more non-transient processor-readable storage devices can be used to implement both the trigger data store 210 and the mapping data store 220. The trigger data store 210 can have, stored thereon, one or more trigger thresholds associated with one or more LPAPs. In one implementation, studies have determined a safe level (e.g., as a safe concentration in the air, measured in parts per notation, or the like) of a particular LPAP, and the safe level is stored as a single trigger threshold for the single corresponding LPAP in the trigger data store 210. In another implementation, a single such trigger threshold is stored for each of multiple types of LPAPs. In another implementation, multiple trigger thresholds are stored in the trigger data store 210 for each of one or more LPAPs. For example, a first trigger threshold can indicate a scientifically determined safe level for adults, a second trigger threshold can indicate a scientifically determined safe level for children and pets, a third trigger threshold can indicate an anecdotally generated level determined to be bothersome to an average person, etc.

Some embodiments permit customers and/or other users to provide data for use in determining trigger thresholds. In one embodiment, an application (e.g., for use on a smart phone or other mobile device) provides a feedback portal through which users can submit a current localized report on their subjective experience. As an example, a user walking down a street may experience a subjectively high exposure to marijuana smoke and may rate the present level in the present location through the application. The rating can be sent back to the LPAP mapping system 160', which can use the rating in various ways. According to some uses, the subjective rating (or a collection of subjective ratings crowd-sourced by multiple users) is compared to one or more objective LPAP level measurements from nearby LPAP sensors 130. The comparison can be used to tune or set a trigger threshold, to generate statistics regarding differences between subjective and objective measurements (e.g., to enable statistical generation of an objective "actual level" score and a subjective "feels like" score), to detect issues with LPAP sensors 130 (e.g., miscalibrated or broken sensors), etc. Other uses can treat the data separately, for example, to provide separate objective and subjective data for various locales.

Embodiments of the aggregation processor 230 include a network interface 235 coupled with the one or more communications networks 260 to receive LPAP data samples from the network-connected LPAP sensors 130. As described above, the LPAP sensors 130 are distributed over the geographic region, and each LPAP data sample indicates a respective LPAP level at a respective LPAP sensor location in the geographic region. The sensor locations can correspond to various geographical definitions. Embodiments of the mapping data store 220 can have, stored thereon, geographical definitions for geographic sub-regions within a geographic region. LPAP sensors 130 can be spread over a large geographical region, such as a city (e.g., or any larger or smaller region, such as a neighborhood, county, state, country, etc.). The mapping data store 220 can include any suitable definitions for any suitable resolution of sub-regions. The sub-regions can be as small as a single LPAP sensor 130 location and as large as the geographic region of which it is a sub-region. The geographical definitions can be stored in the mapping data store 220 in any suitable manner. For example, the geographic definition can be a set of global positioning satellite (GPS) coordinates, latitude and longitude pairs, street addresses, map coordinate references, etc.

Embodiments of the mapping processor 240 are coupled with the trigger data store 210, the mapping data store 220, and the aggregation processor 230. The mapping processor 240 can include a scoring interface 245 to output LPAP scores. Each LPAP score is mapped to a respective sub-region of the geographic region. Each LPAP score can be computed as a function of an aggregation of the respective LPAP levels for at least those of the LPAP sensors 130 having respective LPAP sensor locations corresponding to the respective sub-region. For example, an LPAP score can be computed according to the respective resolution of the sub-region (e.g., for a particular LPAP sensor 130, for a particular neighborhood block, for a particular neighborhood, etc.). Each LPAP score can be computed further as a function of comparing the aggregation against the set of trigger thresholds. In some implementations, the comparison involves using the trigger thresholds as normalization data for converting raw LPAP level data from the LPAP sensors 130 into a score that is intuitive to a human user, or the like. For example, the score can be on a scale from 0 to 100, regardless of the type of measurement used for that LPAP (e.g., parts per million, etc.). In other implementations, the computed score is only in relation to the trigger threshold. For example, the score can simply indicate whether the levels for the LPAP are above or below the one or more trigger thresholds.

While some embodiments assume that the LPAP sensors 130 communicate raw LPAP level data to the LPAP mapping system 160', other embodiments can receive pre-processed data from some or all of the LPAP sensors 130. For example, some of the LPAP sensors 130 can convert collected LPAP levels into a normalized data stream, into a score, etc.; and the converted data can be sent to the LPAP mapping system 160'. In other embodiments, some or all LPAP sensors 130 can include internal trigger threshold settings, and they may communicate LPAP level data in relation to those internal trigger thresholds. For example, an LPAP sensor 130 may be configured to save power and/or bandwidth by communicating LPAP level data only periodically, only when the LPAP data exceeds (or falls below) an internal trigger threshold, or at any other suitable time.

In some embodiments, the LPAP mapping system 160' further includes a display processor 250. The display processor 250 can be coupled with the scoring interface 245 and can include a portal interface 255. The portal interface 255 can be coupled with the network(s) 260 so as to be accessible by display devices 265, such as a smart phone, computer, television, or any other computational system having a suitable display and corresponding display and communication hardware and software for receiving and displaying data described herein. Embodiments can receive a map display output generated by the display processor 250 as a function of the LPAP scores. The map display output can be generated and/or communicated in response to a mapping request received from the display device. For example, a user can issue (e.g., via a graphical user interface) a mapping request for a particular set of LPAP levels corresponding to one or more LPAPs across one or more sub-regions, and the map display output can be generated and/or communicated, accordingly.

In some cases, LPAP scores and/or the map display output can be generated in response to the mapping request. For example, the mapping request can indicate a selected one or more LPAPs and a selected one or more sub-regions, and the LPAP scores and/or map display output can be generated in response to the request for the selected parameters. In other cases, the LPAP scores and/or the map display output can be generated prior to receiving a mapping request. For example, various LPAP scores and/or map display outputs can be pre-computed and/or pre-generated and stored in the mapping data store 220 for subsequent use in fulfilling mapping requests. Some embodiments of the mapping data store 220 thus can store historical data, such as historical raw LPAP level data from the LPAP sensors 130, historical subjective data from users or studies, historical computed LPAP scores, etc. In one embodiment, such historical data is used to generate map display outputs in response to a mapping request designating a particular historical time or time range. In another embodiment, such historical data is used to generate statistical and/or other computations, such as to interpolate, extrapolate, and/or predict LPAP data for particular locations and/or times. Such computations can be used, for example, to compare actual present levels to predicted present levels, to generate predicted map display outputs for future times, etc.

Figure 3:
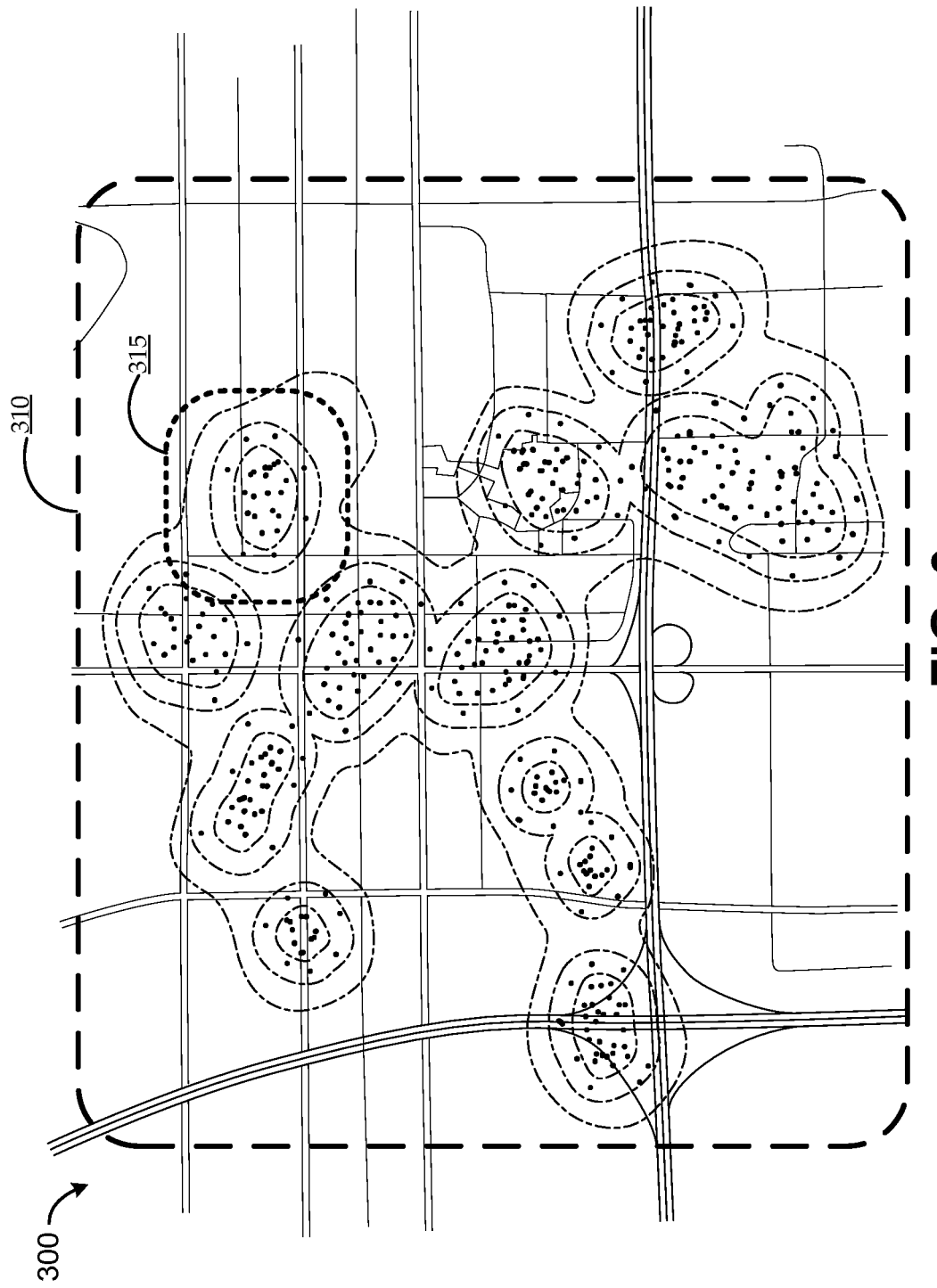
FIG. 3 shows an example of a heat map generated according to various embodiments.

In some implementations, the map display output includes a heat map indicating the respective LPAP scores mapped for a plurality of the sub-regions. FIG. 3 shows an example of a heat map 300 generated according to various embodiments. The heat map can be generated by one of the display devices 265 according to the map display output received from the display processor 250 and generated by the mapping processor 240. The illustrated heat map 300 shows LPAP level data across multiple sub-regions 315 of a geographical region 310. As illustrated, different levels of a particular LPAP can be indicated by color, shading, or in any other suitable manner.

Figure 4:
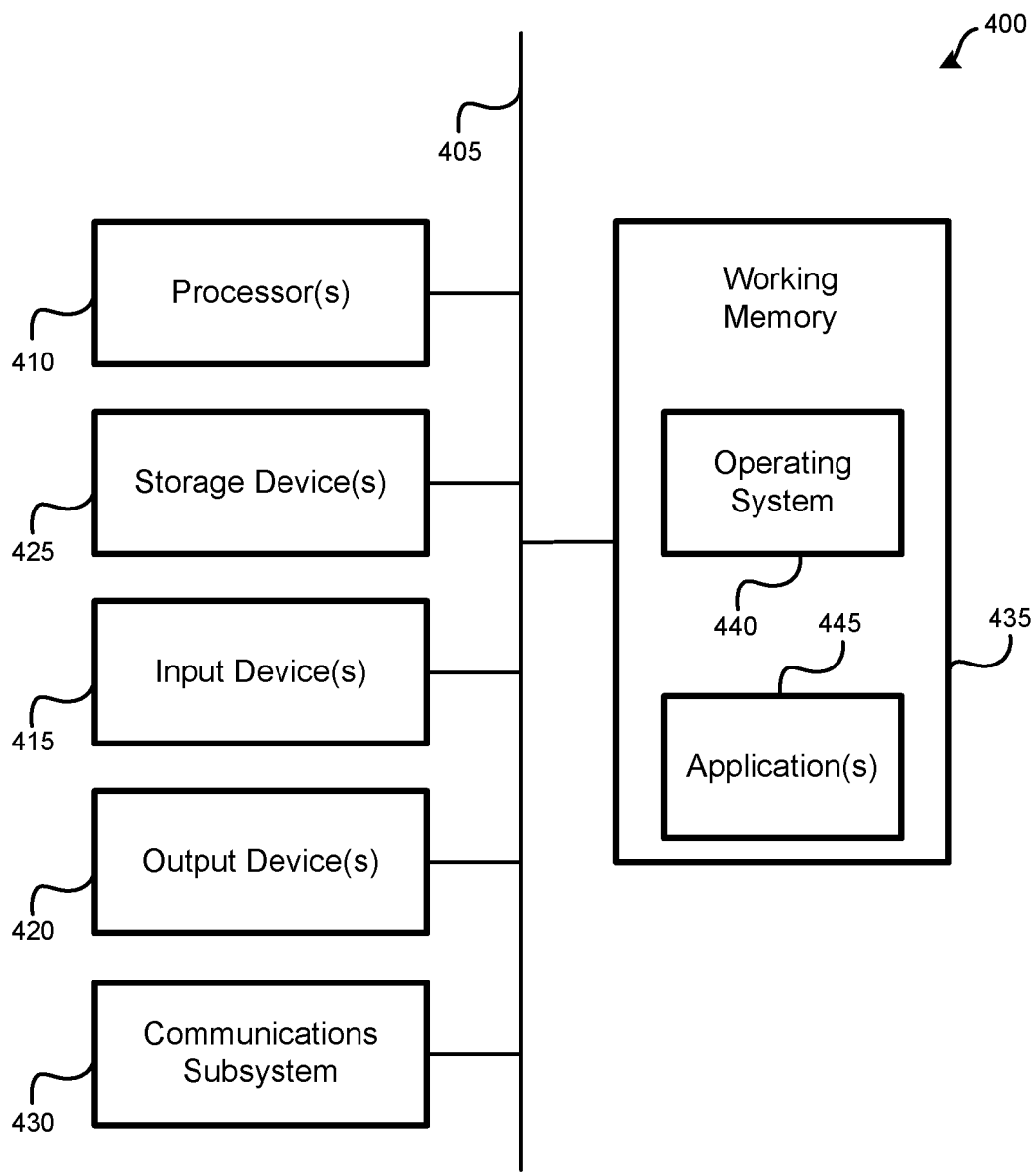
FIG. 4 provides a schematic illustration of one embodiment of a computer system that can implement various system components and/or perform various steps of methods provided by various embodiments described herein.

A computer system as illustrated in FIG. 4 may be incorporated as part of the previously described computerized devices. FIG. 4 provides a schematic illustration of one embodiment of a computer system 400 that can implement various system components and/or perform various steps of methods provided by various embodiments described herein. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 400 might also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the network described below, to name one example), other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

As an example, embodiments of the non-transitory computer-readable storage medium include processor-readable instructions that cause one or more processors 410 of a network-aggregated LPAP mapping system to perform various steps. The processor(s) 410 can receive data samples for a LPAP via a communications network (e.g., via the communications subsystem 430) from network-connected LPAP sensors distributed over a geographic region. Each LPAP data sample can indicate a respective LPAP level at a respective LPAP sensor location in the geographic region. A set of trigger thresholds associated with the LPAP (e.g., stored in the storage device(s) 425 and/or in working memory 435) can be identified. The processor(s) 410 can compute LPAP scores, each mapped to a respective sub-region of the geographic region. Each LPAP score can be computed as a function of an aggregation of the respective LPAP levels for at least those of the LPAP sensors having respective LPAP sensor locations corresponding to a respective sub-region of the geographic region, and as a function of comparing the aggregation against an identified set of trigger thresholds. In some embodiments, the set of trigger thresholds associated with the LPAP, and/or geographical definitions for the plurality of geographic sub-regions of the geographic region, can be stored in the storage device(s) 425 and/or in working memory 435. In some implementations, the processor(s) 410 can output the LPAP scores for display. For example, a mapping request can be received (e.g., via the communications subsystem 430 and/or via one or more input devices 415) that indicates a selected set of the sub-regions, and the processor(s) 410 can output the LPAP scores for display by generating a map display output to indicate the respective LPAP scores for the requested selected set of the sub-regions.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
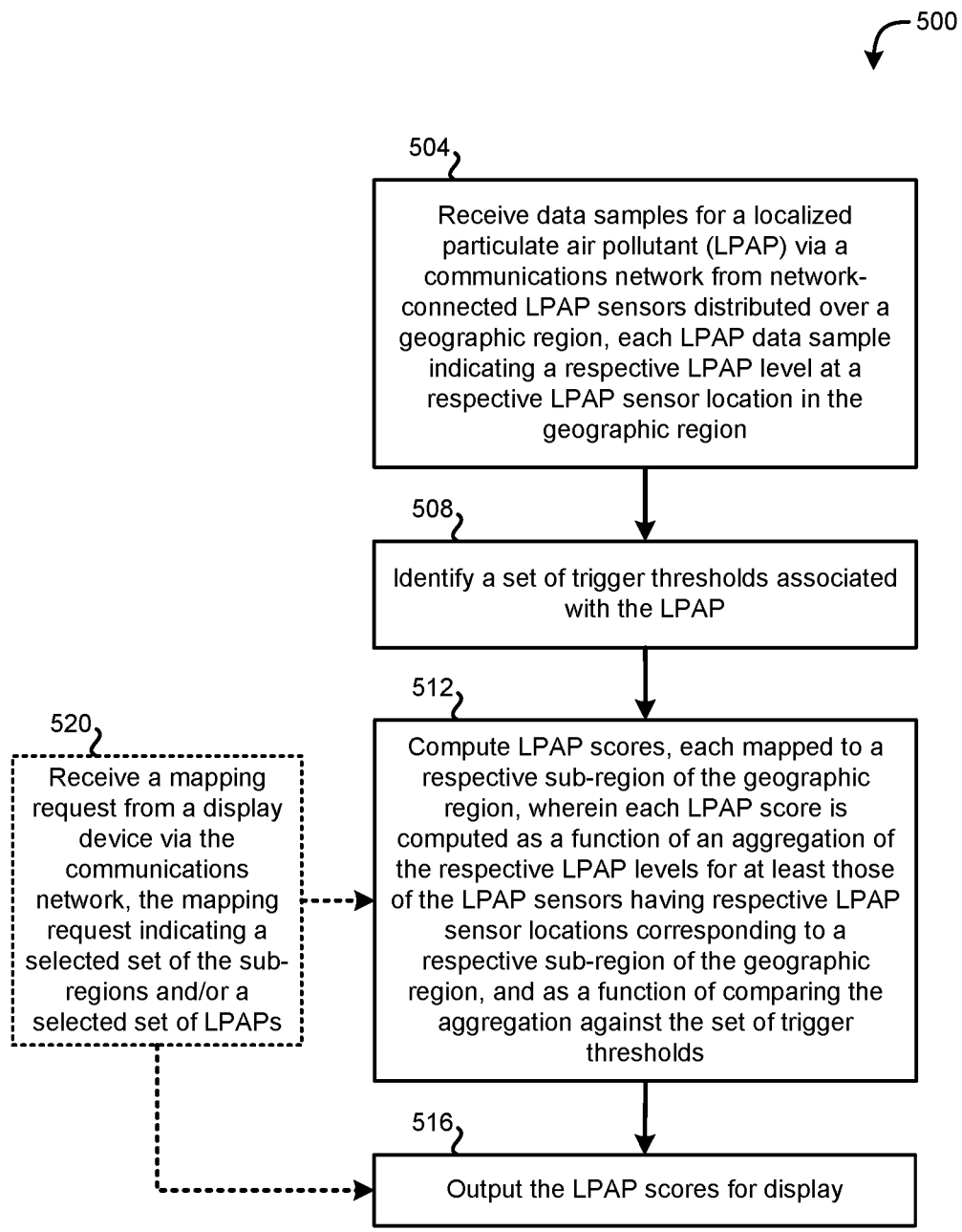
FIG. 5 shows a flow diagram of an illustrative method, according to various embodiments.

Systems including those described above can be used to implement various methods 500. FIG. 5 shows a flow diagram of an illustrative method 500, according to various embodiments. Embodiments of the method 500 begin at stage 504 by receiving data samples for a LPAP via a communications network from network-connected LPAP sensors distributed over a geographic region. Each LPAP data sample can indicate a respective LPAP level at a respective LPAP sensor location in the geographic region. At stage 508, embodiments can identify a set of trigger thresholds associated with the LPAP. At stage 512, embodiments can compute LPAP scores, each mapped to a respective sub-region of the geographic region. Each LPAP score can be computed as a function of an aggregation of the respective LPAP levels for at least those of the LPAP sensors having respective LPAP sensor locations corresponding to a respective sub-region of the geographic region, and as a function of comparing the aggregation against the set of trigger thresholds.

At stage 516, embodiments can output the LPAP scores for display. In some embodiments, at stage 520, a mapping request can be received from a display device via the communications network, and the mapping request can indicate a selected set of the sub-regions.

In such embodiments, the outputting at stage 516 can include generating a map display output in response to the mapping request to indicate the respective LPAP scores for the selected one or more of the sub-regions. For example, generating the map display output can include generating a heat map indicating the respective LPAP scores for the selected set of the sub-regions mapped in graphical relationship to a graphical representation of the selected set of the sub-regions. In some such embodiments, the set of trigger thresholds includes a first trigger threshold indicating a predefined unsafe LPAP level and a second trigger threshold indicating a predefined undesirable LPAP level that is lower than the first trigger threshold, and the heat map is generated to graphically distinguish between locales having LPAP levels higher than the first threshold, locales having LPAP levels lower than the first threshold and higher than the second threshold, and locales having LPAP levels lower than the second threshold.

In other embodiments, the LPAP data samples indicate respective LPAP levels at respective LPAP sensor locations in the geographic region for each of multiple different LPAPs (e.g., cigarette smoke, marijuana smoke, smoke from a small factory, etc. In such embodiments, computing the LPAP scores at stage 512 can include computing respective LPAP scores for each of the different LPAPs. In some such cases, the identifying at stage 508 can include identifying a respective set of trigger thresholds associated with each of the LPAPs. In some embodiments, at stage 520, the mapping request received from the display device can additionally or alternatively indicate a selected one or more of the LPAPs; and the outputting at stage 516 cab include generating the map display output in response to the mapping request to indicate the respective LPAP scores for each of the selected set of LPAPs (e.g., in each of the selected set of sub-regions).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system comprising:
a trigger data store having stored thereon a set of trigger thresholds associated with a localized particulate air pollutant (LPAP);
a mapping data store having stored thereon geographical definitions for a plurality of geographic sub-regions within a geographic region;
an aggregation processor having a network interface coupled with a communications network to receive LPAP data samples from a plurality of network-connected LPAP sensors distributed over the geographic region, each LPAP data sample indicating a respective LPAP level at a respective LPAP sensor location in the geographic region; and
a mapping processor coupled with the trigger data store, the mapping data store, and the aggregation processor, and having a scoring interface to output a plurality of LPAP scores, each mapped to a respective sub-region of the geographic region,
wherein each LPAP score is computed as a function of an aggregation of the respective LPAP levels for at least those of the LPAP sensors having respective LPAP sensor locations corresponding to the respective sub-region, and as a function of comparing the aggregation against the set of trigger thresholds.

2. The system of claim 1, further comprising:
a display processor coupled with the scoring interface and comprising a portal interface accessible via the communications network by a display device to receive a map display output generated by the display processor as a function of the LPAP scores and in response to a mapping request received from the display device.

3. The system of claim 2, wherein the map display output comprises a heat map indicating the respective LPAP scores mapped for a plurality of the sub-regions.

4. The system of claim 1, wherein the set of trigger thresholds comprises a plurality of trigger thresholds associated with the LPAP.

5. The system of claim 1, wherein:
the trigger data store has stored thereon a set of trigger thresholds associated with each of a plurality of LPAPs;
the LPAP data samples indicating respective LPAP levels at respective LPAP sensor locations in the geographic region for at least a first LPAP and a second LPAP that is different from the first LPAP; and
the plurality of LPAP scores comprises a first plurality of LPAP scores computed for the first LPAP and a second plurality of LPAP scores computed for the second LPAP.

6. The system of claim 5, further comprising:
a display processor coupled with the scoring interface to generate a map display output as a function of the LPAP scores, wherein the map display output comprises a heat map indicating respective ones of the first and second LPAP scores mapped for a plurality of the sub-regions.

7. The system of claim 1, wherein:
the communications network comprises a low-power narrowband network; and
at least a portion of the plurality of network-connected LPAP sensors is communicatively coupled with the low-power narrowband network.

8. The system of claim 1, wherein:
the communications network comprises a cellular network; and
at least a portion of the plurality of network-connected LPAP sensors is communicatively coupled with the cellular network.

9. The system of claim 1, wherein:
at least one of the plurality of network-connected LPAP sensors is disposed indoors and communicatively coupled with a wireless local area network, which is communicatively coupled with the communications network.

10. A method comprising:
receiving data samples for a localized particulate air pollutant (LPAP) via a communications network from a plurality of network-connected LPAP sensors distributed over a geographic region, each LPAP data sample indicating a respective LPAP level at a respective LPAP sensor location in the geographic region;

identifying a set of trigger thresholds associated with the LPAP;

computing a plurality of LPAP scores, each mapped to a respective sub-region of the geographic region, wherein each LPAP score is computed as a function of an aggregation of the respective LPAP levels for at least those of the LPAP sensors having respective LPAP sensor locations corresponding to a respective sub-region of the geographic region, and as a function of comparing the aggregation against the set of trigger thresholds; and outputting the plurality of LPAP scores for display.

11. The method of claim 10, further comprising:
receiving a mapping request from a display device via the communications network, the mapping request indicating a selected set of the sub-regions,
wherein the outputting comprises generating a map display output in response to the mapping request to indicate the respective LPAP scores for the selected set of the sub-regions.

12. The method of claim 11, wherein generating the map display output comprises generating a heat map indicating the respective LPAP scores for the selected set of the sub-regions mapped in graphical relationship to a graphical representation of the selected set of the sub-regions.

13. The method of claim 12, wherein:
the set of trigger thresholds comprises a first trigger threshold indicating a predefined unsafe LPAP level and a second trigger threshold indicating a predefined undesirable LPAP level that is lower than the first trigger threshold; and
the heat map is generated to graphically distinguish between locales having LPAP levels higher than the first threshold, locales having LPAP levels lower than the first threshold and higher than the second threshold, and locales having LPAP levels lower than the second threshold.

14. The method of claim 10, wherein:
the LPAP data samples indicate respective LPAP levels at respective LPAP sensor locations in the geographic region for each of a plurality of LPAPs; and
computing the plurality of LPAP scores comprises computing a respective plurality of LPAP scores for each of the plurality of LPAPs.

15. The method of claim 14, wherein:
the identifying comprises identifying a respective set of trigger thresholds associated with each of the plurality of LPAPs.

16. The method of claim 14, further comprising:
receiving a mapping request from a display device via the communications network, the mapping request indicating a selected set of the sub-regions and a selected set of the plurality of LPAPs,
wherein the outputting comprises generating a map display output in response to the mapping request to indicate the respective LPAP scores for each of the selected set of the plurality of LPAPs in each of the selected set of the sub-regions.

17. A non-transitory processor-readable medium comprising processor-readable instructions that cause one or more processors of a network-aggregated localized particulate air pollutant (LPAP) mapping system to:
receive data samples for a localized particulate air pollutant (LPAP) via a communications network from a plurality of network-connected LPAP sensors distributed over a geographic region, each LPAP data sample indicating a respective LPAP level at a respective LPAP sensor location in the geographic region;
identify a set of trigger thresholds associated with the LPAP; and
compute a plurality of LPAP scores, each mapped to a respective one of a plurality of sub-regions of the geographic region, wherein each LPAP score is computed as a function of an aggregation of the respective LPAP levels for at least those of the LPAP sensors having respective LPAP sensor locations corresponding to a respective sub-region of the geographic region, and as a function of comparing the aggregation against the set of trigger thresholds.

18. The non-transitory processor-readable medium of claim 17, further comprising:
a trigger data store having stored thereon the set of trigger thresholds; and
a mapping data store having stored thereon geographical definitions for the plurality of geographic sub-regions of the geographic region.

19. The non-transitory processor-readable medium of claim 17, wherein the processor-readable instructions cause the one or more processors further to:
output the plurality of LPAP scores for display.

20. The non-transitory processor-readable medium of claim 17, wherein the processor-readable instructions cause the one or more processors further to:
receive a mapping request via the communications network, the mapping request indicating a selected set of the sub-regions,
wherein the outputting comprises generating a map display output in response to the mapping request to indicate the respective LPAP scores for the selected set of the sub-regions.

* * * * *